(12) United States Patent
Miura (10) Patent No.: US 6,322,451 B1
(45) Date of Patent: Nov. 27, 2001

(54) GAME MACHINE TO PERMIT PLAYERS TO CHOOSE OTHER PLAYERS TO PLAY AGAINST

(75) Inventor: Katsuhiro Miura, Ichikawa (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/581,937
(22) PCT Filed: Oct. 26, 1999
(86) PCT No.: PCT/JP99/05900
  § 371 Date: Jul. 31, 2000
  § 102(e) Date: Jul. 31, 2000

(30) Foreign Application Priority Data

Oct. 26, 1998 (JP) .................................................. 10-321271

(51) Int. Cl.[7] ....................................................... A63F 13/00
(52) U.S. Cl. ..................................... 463/42; 463/2; 463/6; 463/7
(58) Field of Search ............................... 463/1–8, 30, 31, 463/40, 41, 42, 43, 44

(56) References Cited

U.S. PATENT DOCUMENTS

| 4,572,509 | * | 2/1986 | Sitrick . |
| 4,958,835 | * | 9/1990 | Tashiro et al. . |
| 4,998,199 | * | 3/1991 | Tashiro et al. . |
| 5,299,810 | * | 4/1994 | Pierce et al. . |
| 5,667,440 | * | 9/1997 | Sasaki et al. . |
| 5,816,920 | * | 10/1998 | Hanai . |
| 5,855,516 | * | 1/1999 | Eiba . |
| 5,879,236 | * | 3/1999 | Lambright . |
| 5,922,053 | * | 7/1999 | Okada . |
| 5,947,825 | * | 9/1999 | Horstmannn et al. . |
| 5,964,660 | * | 10/1999 | James et al. . |
| 6,023,729 | * | 2/2000 | Samuel et al. . |
| 6,061,722 | * | 5/2000 | Lipa et al. . |
| 6,128,660 | * | 10/2000 | Grimm et al. . |

FOREIGN PATENT DOCUMENTS

| A-9-94350 | 4/1997 | (JP) . |
| A-10-286381 | 10/1998 | (JP) . |
| A-11-319319 | 11/1999 | (JP) . |

* cited by examiner

Primary Examiner—Michael O'Neill
(74) Attorney, Agent, or Firm—Oliff & Berridge, PLC

(57) ABSTRACT

An objective is to provide a game machine and information storage medium enabling a player to freely select another player for playing a game together. A list screen of other players' information (or information relating to any other player for playing a game together within a common game space) is displayed. When a player selects another player for playing a game together while viewing the list screen, a computation is performed for implementing a game play between the player and the selected player in a common game space. The other players' information may include information of other players' game scores, information of other players' histories (which can be retrieved by inputted identification information), information of characters controlled by other players. The other players' information may further include remodeling information of motorcars and message information inputted by other players. If a player does not select another player, the player can play a game with a computer. A player can reserve another player to play with, or a game space for a game play. By offering reservation to another player who is playing with a different player at that time, a game play with the player is reserved.

16 Claims, 11 Drawing Sheets

COMMUNICATIONS DATA

| MACHINE NUMBER | IN-PLAY FLAG | IN-FIGHT FLAG | OPPONENT MACHINE NUMBER | GAME SCORE DATA | IN-USE CHARACTER DATA | RESERVATION OFFERING DATA | --- |

GAME MACHINE TO PERMIT PLAYERS TO CHOOSE OTHER PLAYERS TO PLAY AGAINST

TECHNICAL FIELD

This invention relates to a game machine and information storage medium for a multi-player type of game.

BACKGROUND ART

There have been developed and actually used various multi-player type of game machines in which a plurality of players can enjoy the same game at the same time. In such a game, for example, each player can be provided with a game machine, each game machine being designed to output game images and sounds toward the corresponding player. Each player thus can enjoy a fight or cooperation with other players in the game while viewing the outputted game images and hearing the outputted game sounds.

Figure 1:
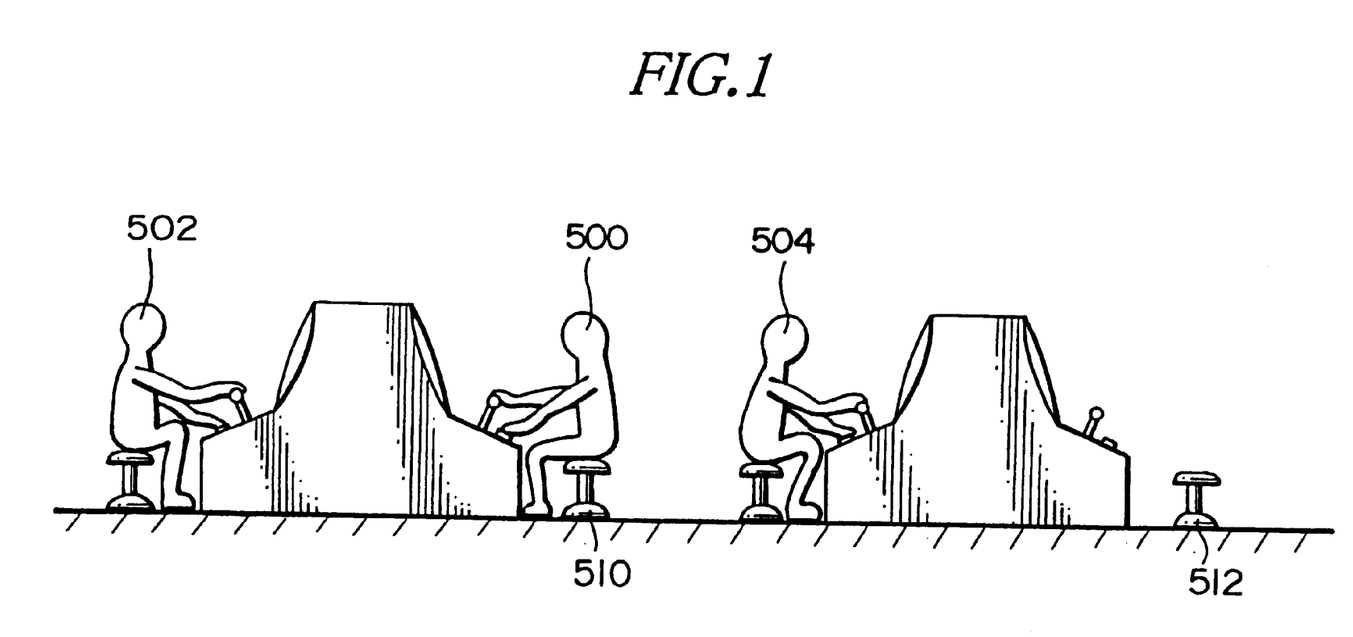
FIG. 1 is a view illustrating problems in the conventional game machines.

However, such game machines had the following problem. Referring to FIG. 1, a player 500 has to sit on a seat 510, for example, when he or she desires to fight against another player 502. On the other hands, the player 500 has to sit on a seat 512 when he or she wants to fight against a further player 504. When the player 500 desires to fight against the player 502 and if the seat 510 is not empty, the player 500 has to wait until the seat 510 becomes empty. In the conventional game machine, thus, the freedom to select an opponent player was limited.

For a tournament type of game (in which only a winner can get the right to continue the game), a player 504 who is winning successive victories can not play a fighting game against another player until the next challenger sits on the seat 512.

DISCLOSURE OF THE INVENTION

The present invention was devised in the light of the above described technical problems and has as an objective thereof the provision of a game machine and information storage medium that make it possible for a player to freely select another player for playing together.

In order to solve the above technical problems, a game machine of the present invention for a multi-player type of game in which a plurality of players play a game, comprises: means for outputting information of other players with whom a player can play a game in a common game space; means for a player to select at least one player from among other players for playing together, based on the other players' information; and means for performing game computation for enabling a player and the selected player to play a game in a common game space.

According to the present invention, a player can receive information of other players. While referring to other players' information, the player selects a desired player among other players. Thus, the player can enjoy a fighting or cooperation against or together with the selected player in a common game space. According to the present invention, a player can freely select any of other players for playing the game together while referring to the other players' information. Consequently, it can be prevented that a player is forced to play a game with any unwanted player who is extremely stronger or weaker than the player. The other players' information gives a player a feeling that he or she is playing with human players rather than a computer, improving the virtual reality. The other players' information also stimulates the player to play a fighting or cooperation game against or together with other players.

The other players' information may include at least one of information of other players' game scores, information of other players' histories, and information of moving bodies controlled by other players. Thus, a player can get helpful information for selecting another player. More particularly, a player can recognize a difference in game skills between the player and other players by referring to the game score information or history information (such as information of summed scores or previous scores). By the information of moving bodies controlled by other players, a player can also easily confirm the compatibility with the player's own moving body. The term "moving body" is an object to be controlled by a player and may include a character, robot, vehicle, tank, aircraft, spaceship, ship, speedboat, ski, surfboard, ball, and bullet.

The information of other players' histories may be retrieved and outputted based on identification information inputted by other players. The use of ID information enables to retrieve and output the history information in a simple and easy manner.

The other players' information may include parameter information of moving bodies controlled by other players. Thus, a player can obtain parameter information relating to all the other moving bodies (e.g., remodeling information). Such parameter information is helpful when a player selects a desired player among other players for playing a game together. In addition, game players can boast about the ability of the moving bodies controlled by them.

The other players' information may include message information inputted by other players. This can increase the variety of information relating to other players and also the virtual reality.

When a player has not selected another player for playing together, game computation may be performed to implement a game play between the player and a computer in a common game space. Thus, a player who does not want to play with any other player can enjoy a game play.

The game machine may further comprise means for reserving at least one of: other players with whom a player can play a game; and a game space in which the player can play a game with other players. Thus, the player can later play a game together with the selected player who is not able to play at that time. This increases the range of selection for the player. The player can reserve a game play in a game space while referring to other players who are to play a game in that game space.

When a player selects another player who is playing with a different player at that time, a new game play with the selected player may be reserved. Thus, the player can later play the game together with the selected player who is playing with a different player at that time. This can increase the range of selection for the player.

BEST MODE FOR CARRYING OUT THE INVENTION

The present invention will now be described by way of example with reference to the drawings.

1. Connection Between Game Machines

Figure 2:
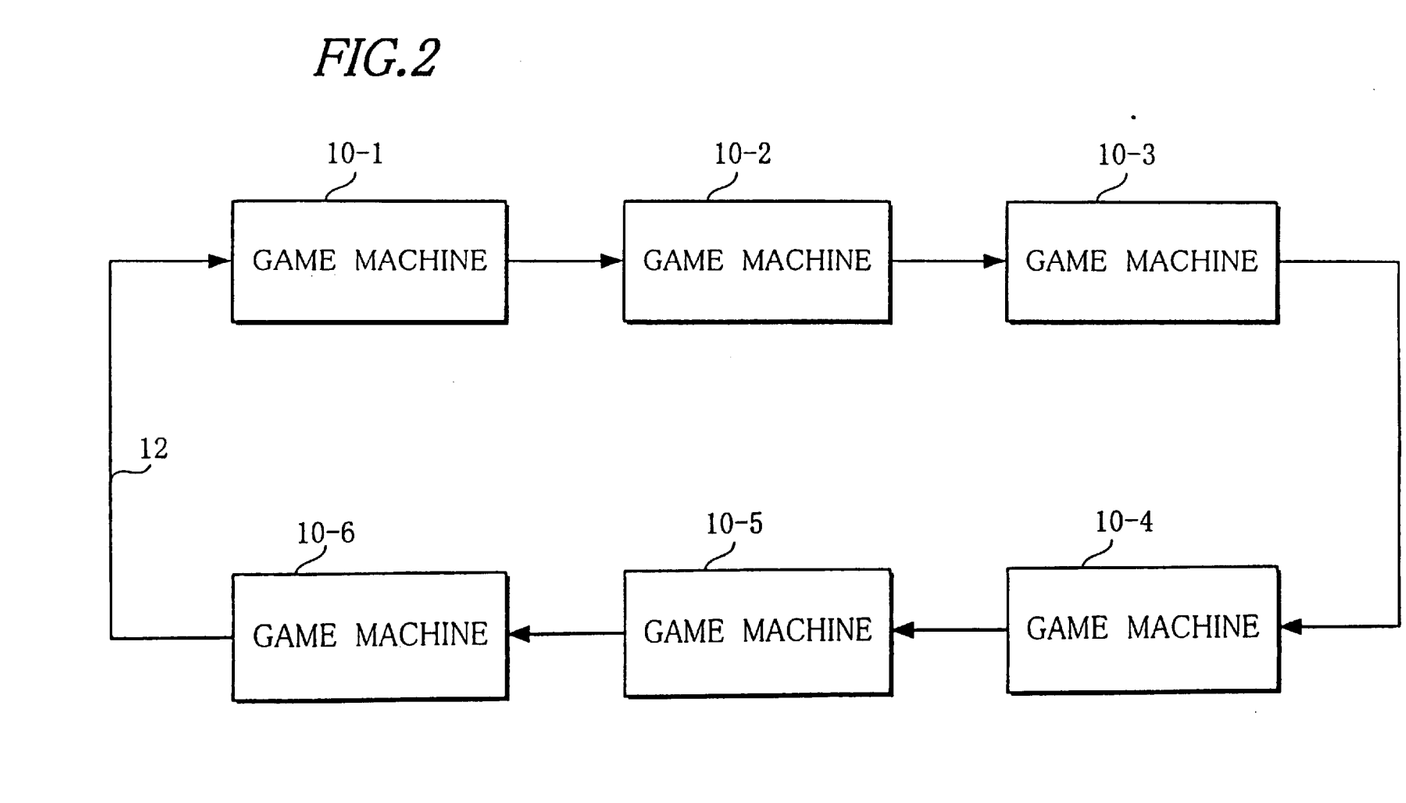
FIG. 2 is a view showing a connection between the game machines according to one embodiment of the present invention.

Connection between game machines is shown in FIG. 2.

According to this embodiment, there are a plurality of independent game machines 10-1, 10-2, 10-3, 10-4, 10-5 and 10-6 which may be interconnected in a form of ring or loop, for example. Each of the game machines 10-1 to 10-6 receives data from or transmits data to the other game machines through a transmission line (or communications line) 12. In this embodiment, data will be transmitted clockwise through the transmission line 12.

Each of the game machines 10-1 to 10-6 is so designed that it can independently perform a single-player game.

2. Arrangement of Game Machine

Figure 3:
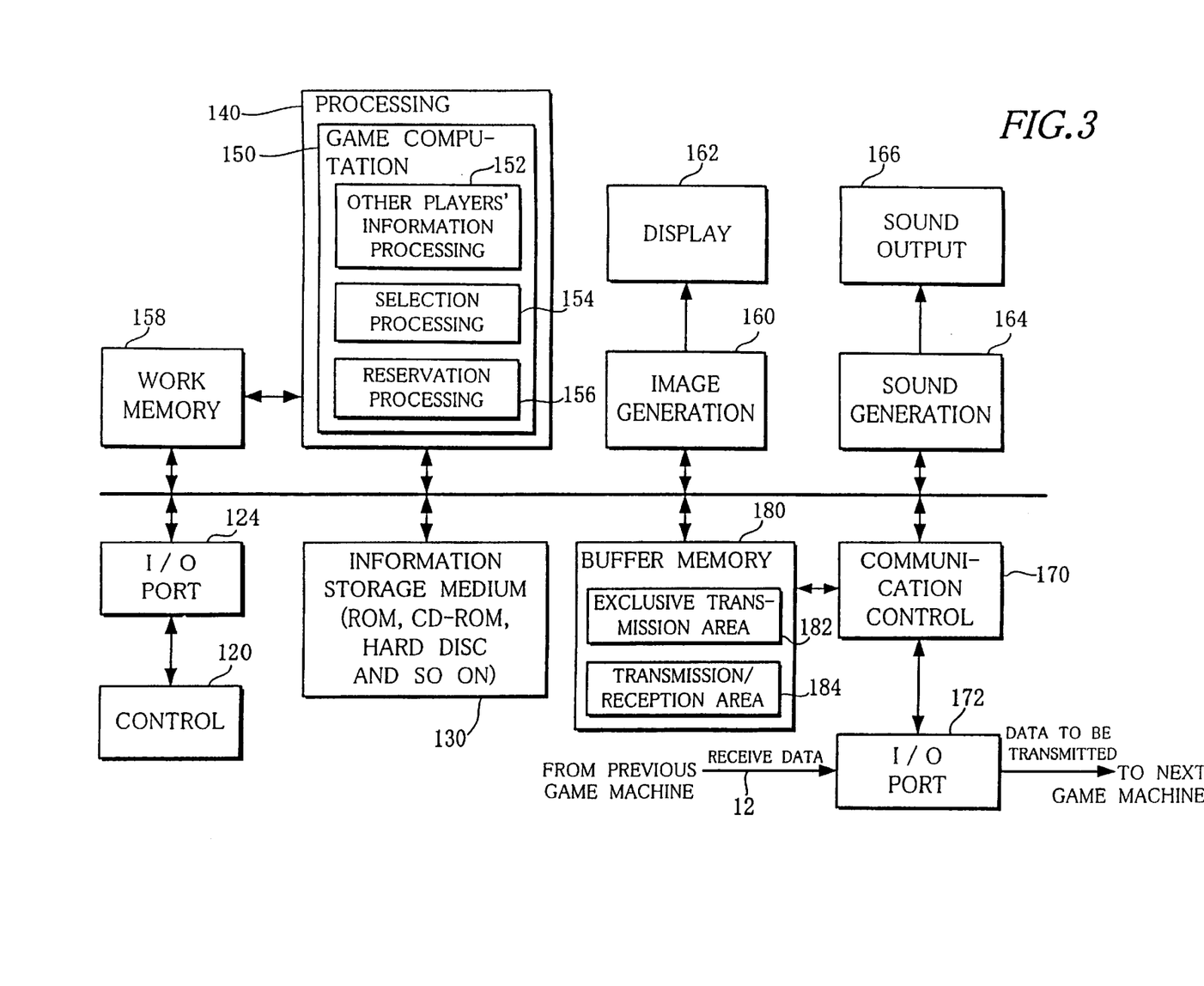
FIG. 3 is a block diagram of a game machine according to this embodiment of the present invention.

FIG. 3 shows a functional block diagram of the game machine.

The game machine comprises a control section 120 for a player inputting operational data. The function can be implemented by hardware such as a lever, a button, a gun, a steering wheel, an accelerator, or a brake pedal.

An information storage medium 130 stores information including a program or data. The function of it can be implemented by hardware such as an optical disk (CDROM or DVD), a magneto-optical disk (MO), magnetic disk, a hard disk, a magnetic tape, a game cassette, an IC card, or a semiconductor memory. This information storage medium 130 stores various items of information for implementing this embodiment of the invention (such as information for outputting information of other players, information for a player selecting any other player, or information for performing game computation for the player and selected other players to play a game together within a common game space). The information stored in the information storage medium comprises at least one type of information, such as program coding for executing the processing of this embodiment, image information, sound information, shape information for display objects, table data, list data, or player information.

The processing section 140 is designed to execute various types of processing, such as controlling the main section, issuing instructions to the various blocks within the game machine, and game computations, where the functions thereof can be implemented by hardware such as a CPU (either CISC or RISC), a DSP, or an ASIC (such as a gate array), or by a given program (game program). The processing section 140 operates based on information such as player's information inputted from the control section 120 through an I/O port 124, and information (program or data) from the information storage medium 130. The processing section 140 also performs various steps of processing by using a work memory 158 as a working area.

The work memory 158 is used as working areas for the processing section 140, the image generation section 160, sound generation section 164, communications control section 170 and so on. The function thereof can be implemented by hardware such as RAM.

Part or all of the information stored in the information storage medium 130 is transferred to the work memory 158 when the game machine is initially powered on.

In response to instructions from the processing section 140, the image generation section 160 generates and outputs various images toward a display section 162. The function thereof can be implemented by hardware such as an image generation ASIC, a CPU or a DSP, or a given program (image generation program).

The sound generation section 164 responds to instructions from the processing section 140 for generating and outputting various sounds toward a sound output section 166. The function thereof can be implemented by hardware such as a sound generation ASIC, a CPU, a DSP, or a given program (sound generation program).

The communications control section 170 performs various controls of communications. The function of it can be implemented by hardware such as a communications ASIC, or a CPU, or a given program (communications program).

A buffer memory 180 temporarily stores received data or data to be transmitted. The function of it can be implemented by hardware such as a RAM. The buffer memory 180 has an exclusive transmission area 182 and a reception/transmission area 184.

Data received from a game machine is written into the reception/transmission area 184 through an I/O port 172 and communications control section 170. If the received data is not necessary, it is transmitted directly to the next game machine through the communications control section 170 and I/O port 172. On the other hand, if the received data is necessary, it is read out by the processing section 140 and then written into the work memory 158. After the data has been subjected to a given processing by the processing section 140 or the like, it is written into the exclusive transmission area 182 as data to be transmitted and then it is sent to the next game machine through the communications control section 170 and I/O port 172.

The processing section 140 further includes a game computation section 150. The game computation section 150 performs various steps of processing such as: processing for setting a game mode; processing for moving the game forward; processing for determining the position and direction of a moving body (such as a character, robot, vehicle, tank, aircraft, spaceship, ship, speedboat, ski, surfboard, ball, or bullet); processing for determining the viewpoint position and line-of-sight direction; processing for reproducing the motion of a moving body; processing for disposing an object within an object space; hit check processing; processing for calculating game score (results); or processing for enabling a plurality of players to play in a common game space.

The game computation section 150 comprises an other players' information processing section 152, a selection processing section 154 and a reservation processing section 156.

The other players' information processing section 152 performs various types of processing for outputting information relating to the other players with whom a player can play a game in a common game space (the other players' information). The selection processing section 154 performs various types of processing for selecting another player with whom a player can play a game together from a plurality of other players based on the other players' information. The reservation processing section 156 performs various types of processing for reserving another player with whom a player can play a game, or a game space in which the player can play the game.

3. Features of this Embodiment

As shown in FIG. 2, each of the game machines (or game terminals) 10-1 to 10-6 is interconnected through the transmission line (or communications line) 12. In this embodiment, communications data having such a format as shown in FIG. 4 may be used through the transmission line 12.

Figure 4:
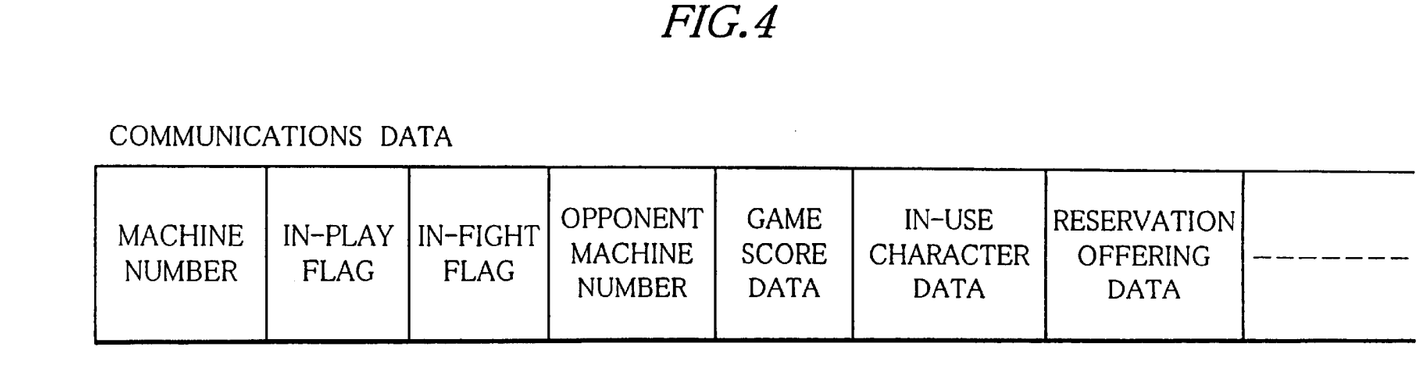
FIG. 4 is a format of communications data transferred between the game machines.
Figure 5:
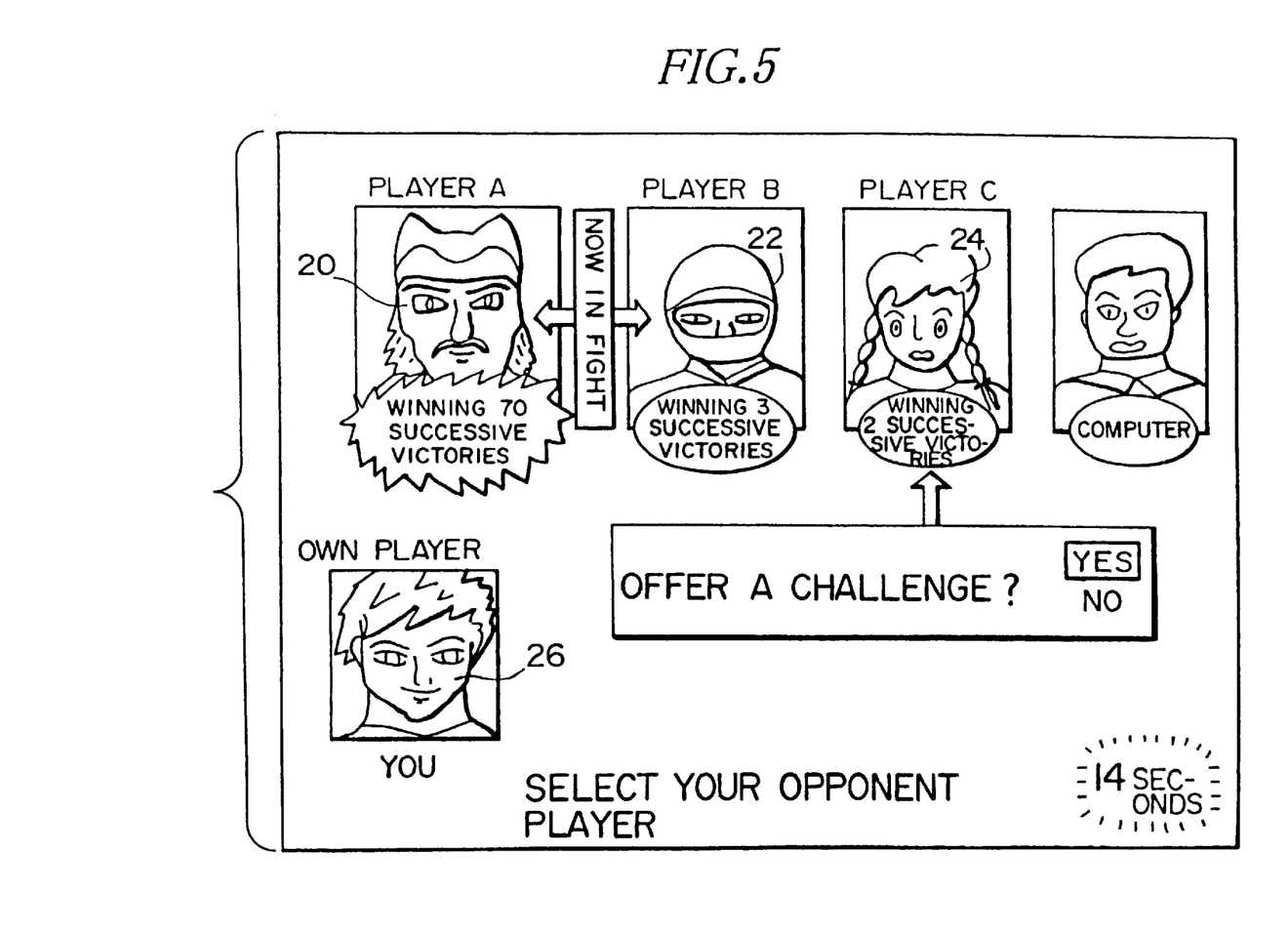
FIG. 5 is an example of an other players' information output screen.

Each game machine retrieves data of a game player who is playing a game (or a machine being now played) from various types of data such as a machine number (number attached to each machine) or an in-play flag (which represents that a player is playing a game with the game machine) in the communications data as shown in FIG. 4. Furthermore, each game machine can check whether or not the retrieved player is fighting against another player and specify that other player, based on an in-fight flag or an opponent machine number in the communications data. Also based on data representing game scores (results) or characters (or moving bodies) in the communications data, each machine can check the game score of the retrieved game player or the character being used by the retrieved player. Each machine then displays an other players' information output screen (opponent player selection screen) as shown in FIG. 5 for enabling a player to select another player for playing a game together. Such processing is carried out by the other players' information processing section 152 and the selection processing section 154 in FIG. 3.

The other players' information output screen shown in FIG. 5 represents that players A, B and C are now playing the game. This can be found by checking the machine number and in-play flag shown in FIG. 4. The other players' information output screen also represents the fact that the players A and B are now fighting against each other. This can be found by checking the in-fight flag and opponent player number shown in FIG. 4. Each of the players A, B and C has won 70, 3 and 2 successive victories, respectively. This can be found by checking the game scores as shown in FIG. 4. The screen further represents characters 20, 22 and 24 being used by the respective players A, B and C. This can be found by checking the in-use character data shown in FIG. 4.

Referring to FIG. 1, a player 500 must sit on a seat 510 when he or she wants to fight against another player 502 and sit on another seat 512 if he or she desires to fight against a further player 504. On the contrary, this embodiment of the present invention is configured such that one player can freely select any player among the other players A, B and C. This increases the degree of freedom on selection of the players. In addition, a player can select an opponent player while referring to various items of information (e.g., game scores) relating to other players A, B and C as shown in FIG. 5. Thus, a player can select an opponent player taking his or her own game skill into account. More particularly, if a player has confidence in his or her game skill, he or she can select player A who has won 70 successive victories. If a player does not have confident in his or her own game skill, he or she can select relatively weak players C winning two successive victories.

FIG. 5 also indicates information of characters 20, 22 and 24 being used by other players A, B and C. Thus, a player can receive advantageous information for selection of his or her opponent player. A game character in a fighting game is usually provided with individual characteristics in its ability. For example, the character 26 operated by a player has the winning percentages against the character 22 operated by player B, that is better than the winning percentages against the character 24 operated by player C. In such a case, the player can select player B as an opponent player rather than player C, based on the information of the characters 20, 22 and 24 controlled by other players A, B and C.

The player operates controls such as a lever or buttons to select an opponent player to fight with. For example, since player C is now fighting against a computer rather than any other players, the player can select player C and also can immediately start a fight against player C On the other hand, players A and B are now fighting against each other. If the player challenges player A or B, therefore, the fight will be reserved. For example, if the player challenges player A, the fight between the player and player A starts after the end of the fight between player A and B (In this case, player A may decline the fight against the player.)

Since it is thus possible to reserve the fight, the degree of selection for players can be further increased. In FIG. 1 showing the prior art, the player 500 must wait to fight against the player 502 until the seat 510 becomes empty. Thus, the player can not fight against the player 502 who is winning successive victories easily. In this embodiment, however, the player can challenge the strongest player A who is now fighting against player B, since the fight can be reserved. As a result, the pleasure of the fighting game can be increased to improve the player's degree of absorption in the game.

Processing for reservation is performed by a reservation processing section 156 by using reservation offering data as shown in FIG. 4. More particularly, if reservation is offered, a game machine offering that reservation transmits reservation offering data to another game machine to be reserved. The game machine to be reserved (or its reservation processing section 156) receives and holds this reservation offering data. If the fight being now performed terminates, the held reservation offering data is then checked. If the game machine to be reserved accepts the reservation, it then informs the game machine offering the reservation of the acceptance with the reservation offering data shown in FIG. 4.

If the player selects neither of the players A, B or C, the player will fight against the computer. Thus, the requirement of any player not wanting a fight against any other player can be fulfilled.

Figure 6:
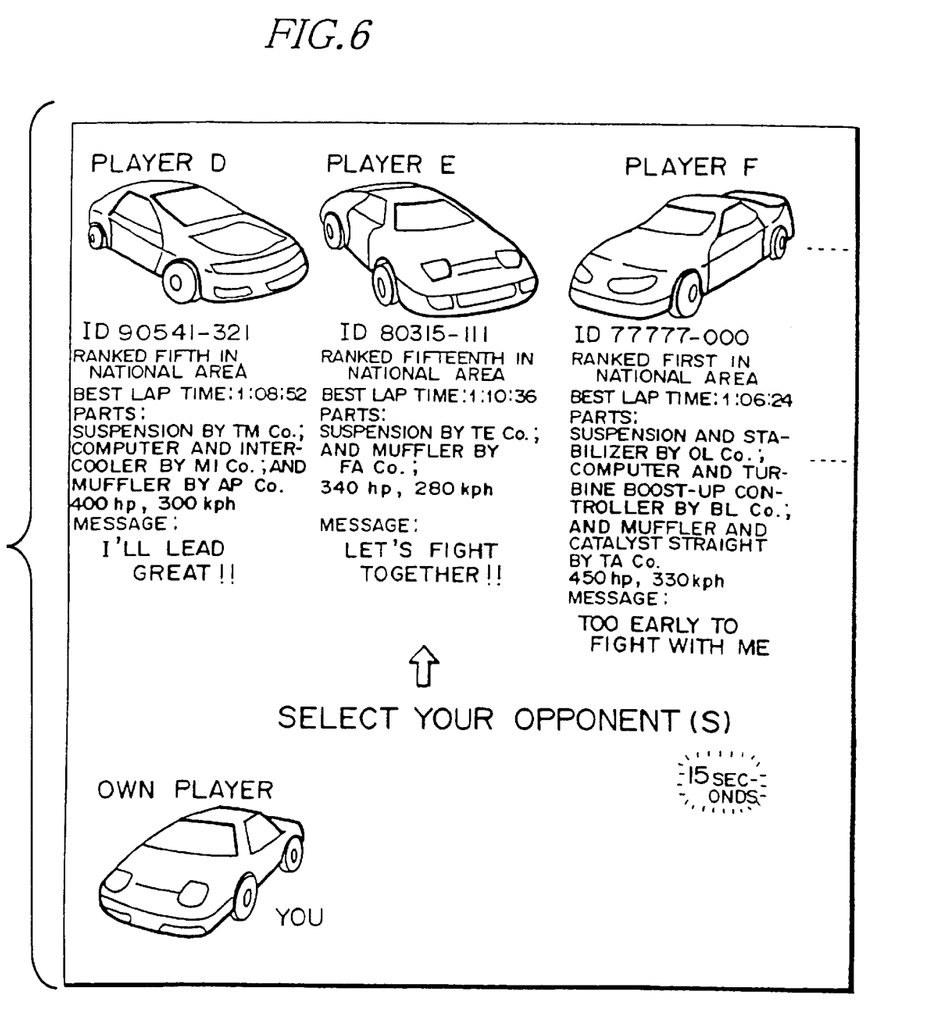
FIG. 6 is another example of the other players' information output screen.

An other players' information output screen in a racing game to which this embodiment is applied is shown in FIG. 6.

In FIG. 6, ID numbers are inputted by other players D, E and F. Using such inputted ID number, a player can retrieve the histories of the other players D, E and F including the past and summed scores and so on, which can be in turn displayed on the screen. FIG. 6 shows that the summed scores of the players D, E and F are fifth, fifteenth and first ranks in the national area, respectively. FIG. 6 further shows the best lap times of the players D, E and F. When the history information relating to other players are displayed, a player can obtain advantageous information for selecting an opponent player. More particularly, a player having no confidence in his or her game skill can select player E who is in the fifteenth rank and has the lowest lap time while viewing the other players' information output screen of FIG. 6. On the contrary, a player having confidence in his or her game skill can select the highest rank player F. The history information properly represents the game skill of each player, in comparison with the normal score information of one race. Therefore, the representation of such history information as materials usable for selecting an opponent player is extremely significant for all the players.

FIG. 6 further shows remodeling information (or parameter information in a broad sense) of motorcars (or moving bodies in a broad sense) controlled by the other players D, E and F. More particularly, the remodeling information indicates which parts (such as suspension, computer, muffler and so on) are mounted on each motorcar. Thus, one player can know the degree of remodeling (tuning) in each motorcar and obtain advantageous information for selecting an opponent player. For example, in FIG. 6, the motorcar of player F includes many parts with its increased degree of tuning. A player having confidence in his or her game skill may be stirred up to challenge player F. On the other hand, the motorcar of player E has its reduced degree of tuning. Therefore, a player having no confidence in his or her game skill can select player E as an opponent. When such remodeling information of motorcar is displayed on the screen, players can boast of their motorcars. Furthermore, one player can further tune his or her motorcar while referring to the remodeling information of other players.

FIG. 6 further shows messages inputted by other players D, E and F. When such messages are displayed, a player can obtain advantageous information for selecting an opponent player. Such messages can stir up a player to increase the player's degree of absorption in the game. Since each message is originally inputted by each player, the degree of variety in the other players' information output screen can be increased. When a player sees the messages, he or she can have a feeling of competing against human beings rather than a computer. This can increase the virtual reality in the game. Contents of the messages may influence the number of offers to compete. Therefore, each player enjoys preparing an attractive message. This can further increase the pleasure in the game.

Although FIG. 6 shows messages on the screen, such messages may be provided in a voice. More particularly, each of the game machines may include a microphone through which a voice message is recorded, the recorded voice message being then transmitted and outputted. Thus, players can hear the voice messages from other players. As a result, players can have a feeling of competing against human beings rather than a computer. This can further increase the virtual reality in the game.

Figure 7:
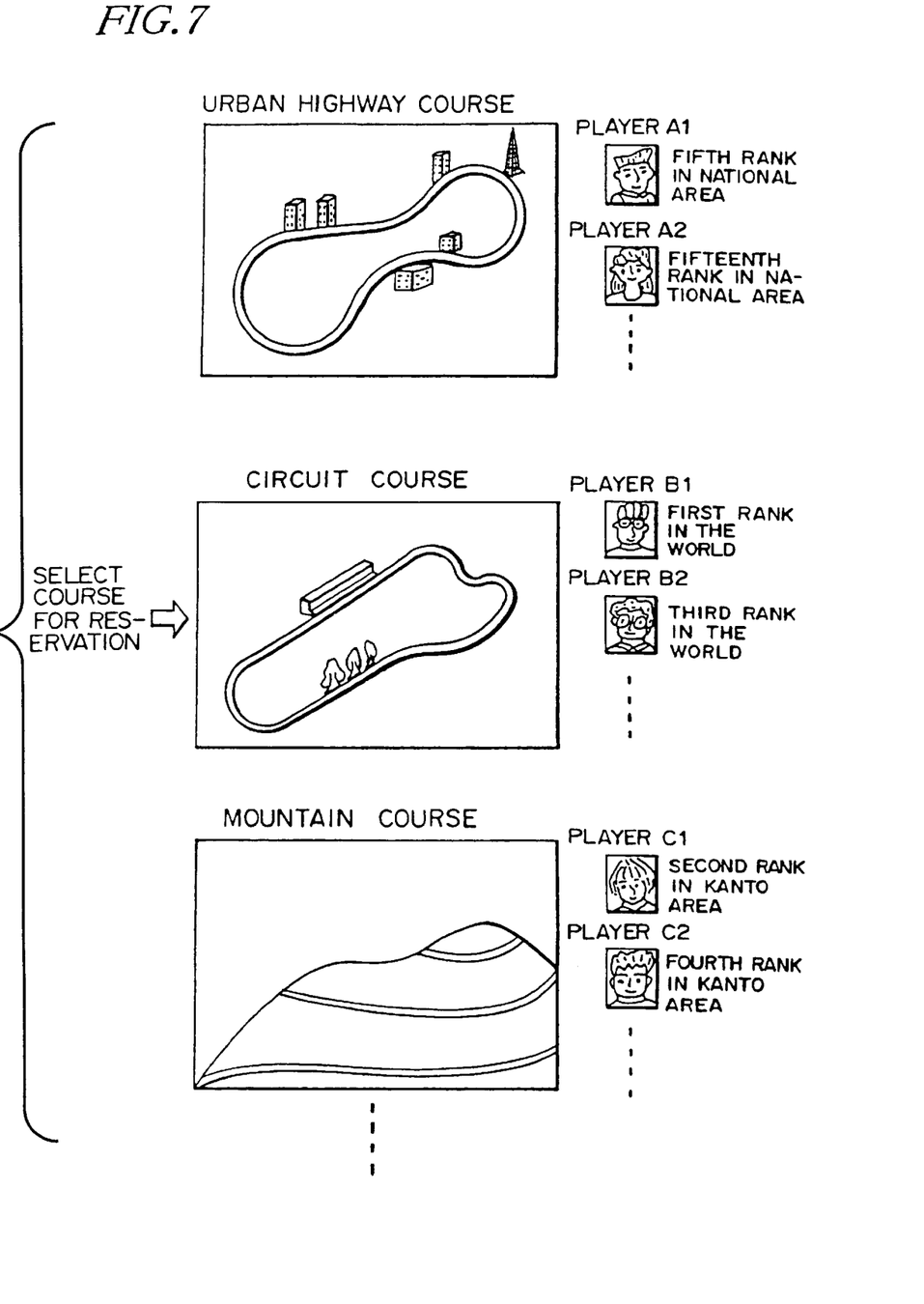
FIG. 7 is a view illustrating a reservation for a game space in which a player is to play a game together with another game player.

Although an object of reservation is any other player as described in connection with FIG. 5, it may be a game space which is used next (such as a racing course, a game stage, a game field, or a game surface in a narrow sense). For example, FIG. 7 shows various racing courses that can be selected and reserved, such as an urban highway, a circuit course and a mountain course. At this time, information relating to other players entering these racing courses (such as player identification, game score information, or history information) is displayed. Therefore, players can reserve a desired racing course while referring to the other players' information. For example, if a player knows the face that first and third rank players enter the circuit course from the other players' information, the player can reserve a game play in that circuit course for competing against the first and third rank players. An effective motivation in entering the game space can be provided to each player. This can increase the number of players to enter the game space and improve the pleasure of the multi-player type of game.

FIG. 7 further shows face images of players A1 and A2 (or player's identification images in a board sense) which have been taken through CCD camera (or any means for taking images). By using such face images, players can promptly and easily know which other players are to enter the racing course. Particularly, if the face image informs that an opponent player is a friend of the player, an acquaintance, or a celebrity, the player's curiosity or competitive spirit can be more stimulated.

4. Processing

Figures 8, 8A:
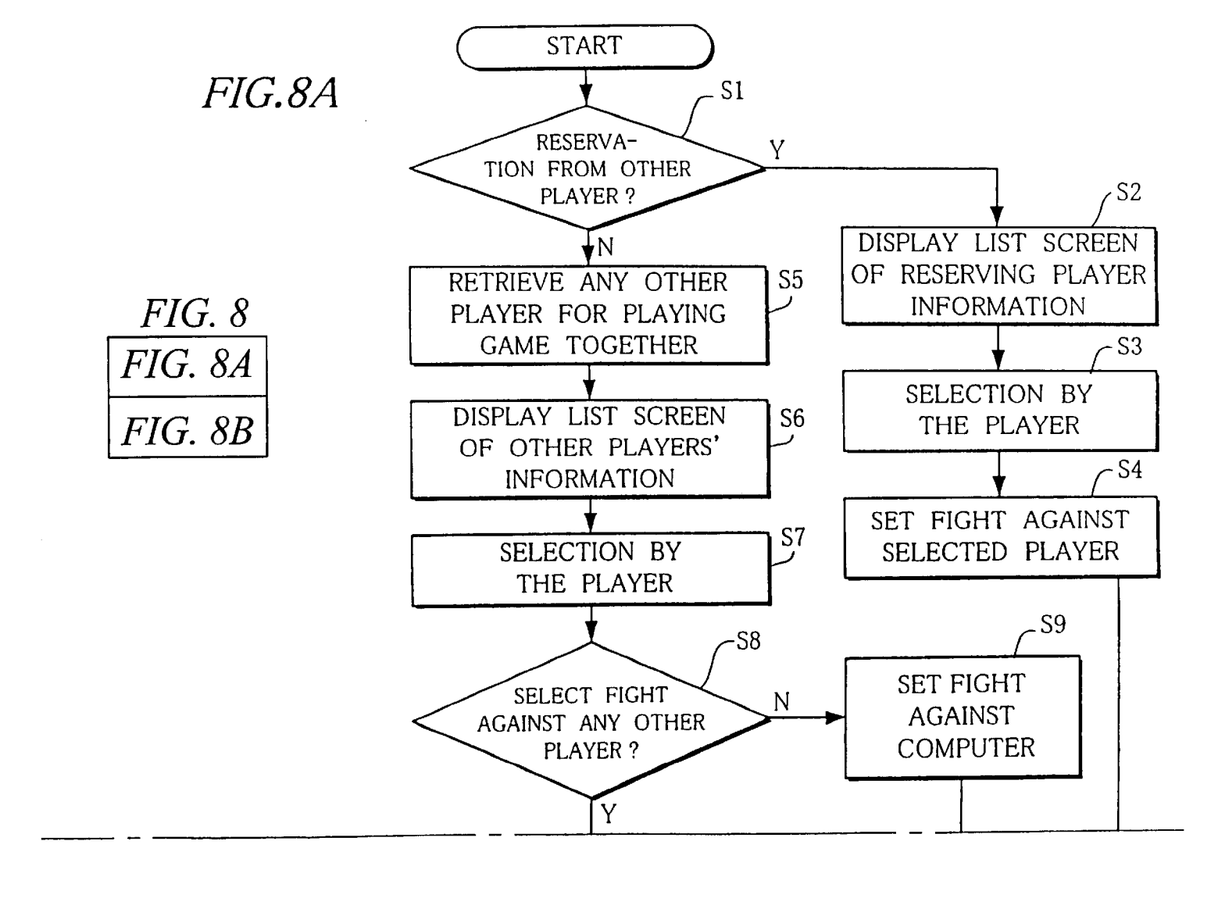
FIG. 8, composed of FIGS. 8A and 8B, is a flow chart illustrating an example of the detailed processes in this embodiment of the present invention.
Figure 8B:
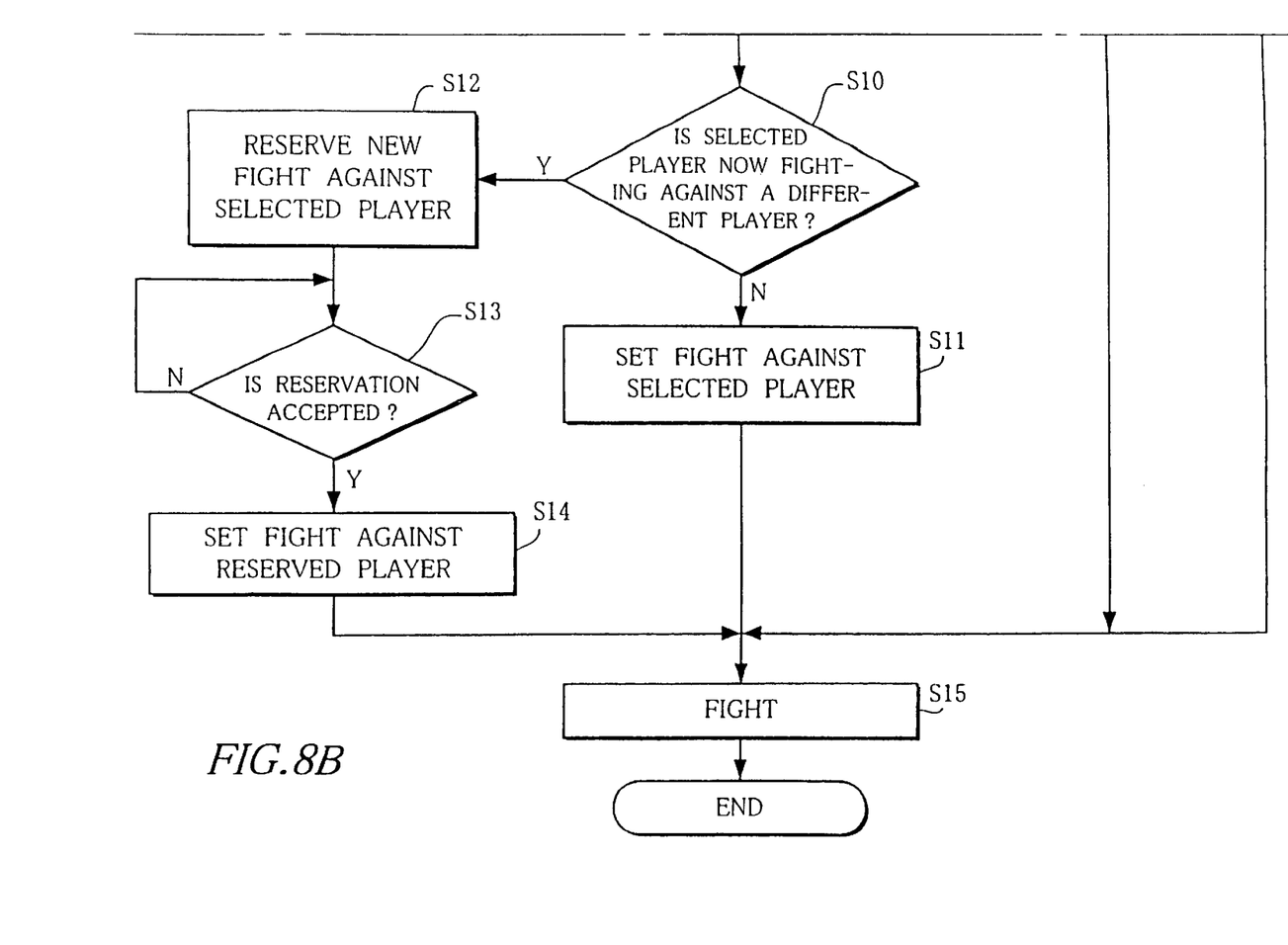

A detailed example of processing in this embodiment will now be described in connection with a flow chart shown in FIG. 8.

At first, the procedure checks whether or not there is a reservation from any other player (step S1). If there is a reservation, a list screen is displayed to show information of the player who has made the reservation (step S2). The list screen is as in FIGS. 5 and 6. If the reserved player accept the reservation, the procedure makes the player who has made the reservation an opponent player and starts the fight (steps S3, S4 and S15).

If there is no reservation, the procedure retrieves any other player which can play the game together (step S5). The procedure then displays a list screen (as in FIGS. 5 and 6) representing information of the retrieved other players (step S6). When a player selects, the procedure determines whether or not the player has selected to fight against any other player (steps S7 and S8). If the player has not selected to fight against any other player, the procedure sets a fight between the player and the computer and then the fight is started (steps S9 and S15).

If it is judged in the step S8 that the player has selected to fight against other player, the procedure then judges whether or not the selected player is now fighting against a different player (step S10). If the selected player is not fighting (that is, the selected player is player C in FIG. 5), the procedure sets a fight between the player and the selected player and then initiates the fight (steps S11 and S15).

If it is judged in the step S10 that the selected player is fighting (that is, the selected player is player A or B in FIG. 5), the procedure reserves a new fight (step S12). The procedure then judges whether or not the reservation is accepted (step S13). If accepted, the procedure sets a fight against the reserved player and then initiates the fight (steps S14 and S15).

In the step S13, the player has to wait until the reservation is accepted, but it may be configured that the player may cancel the reservation when he or she does not desire a prolonged waiting time.

The present invention is not limited to the aforementioned embodiment, but may be carried out in any of various other forms.

Figure 9A:
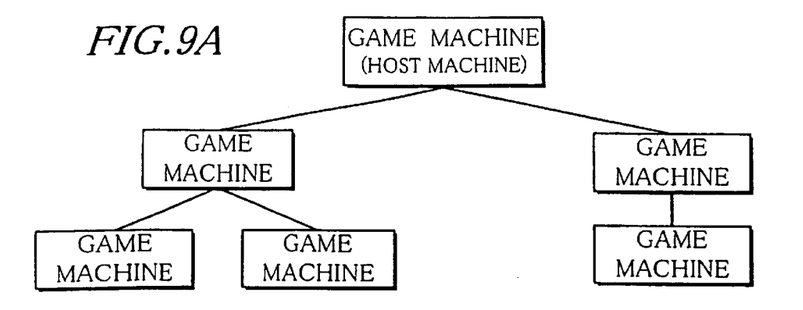
FIGS. 9A, 9B, 9C and 9D illustrate various forms of connection between the game machines.
Figure 9B:
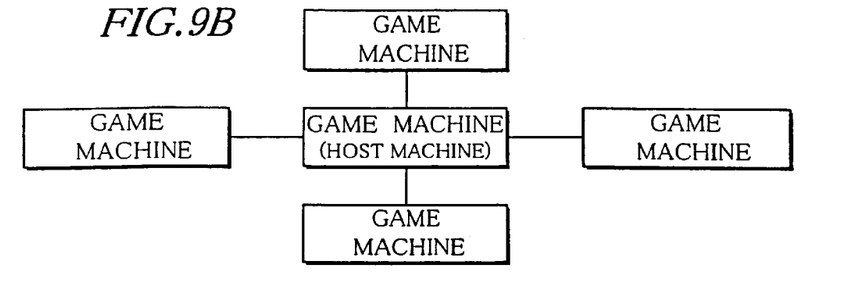

For example, the arrangement of connection between the game machines is not limited to such a ring (or loop) type as shown in FIG. 2. For example, the connection between the game machines may include various arrangements of connection such as tree-type, star-type and so on as shown in FIGS. 9A and 9B. With connection between the game machines under the standard of IEEE1394 or USB, for example, it is desirable to use such a tree-type connection as shown in FIG. 9A. Furthermore, one of the game machines connected together may be used as a host machine.

Figure 9C:
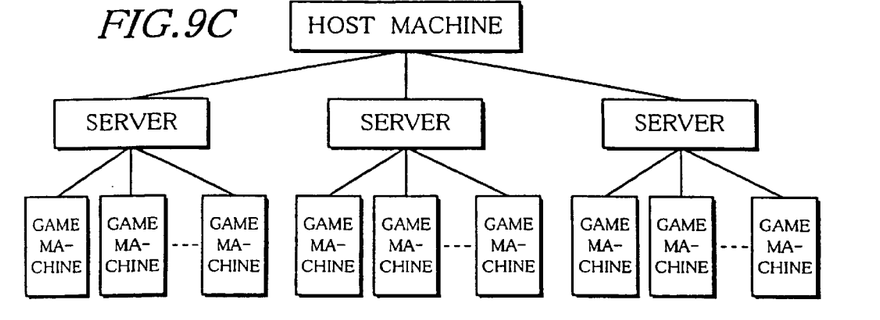

As shown in FIG. 9C, it may be configured that servers are connected under a host machine and each server is connected to a plurality of game machines, the distributed processing being performed by the host machine, game machines and servers.

Figure 9D:
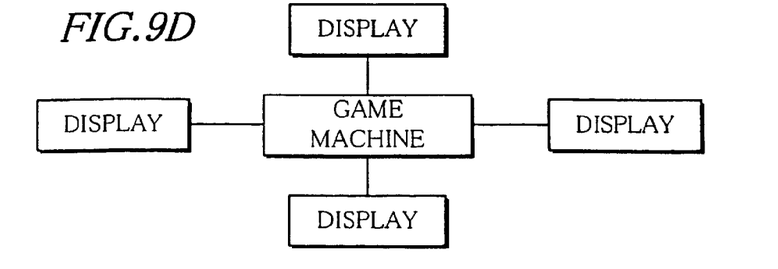

As shown in FIG. 9D, it may be configured that a single game machine has a plurality of display sections designed to display a plurality of game screens for a plurality of players.

Figure 10:
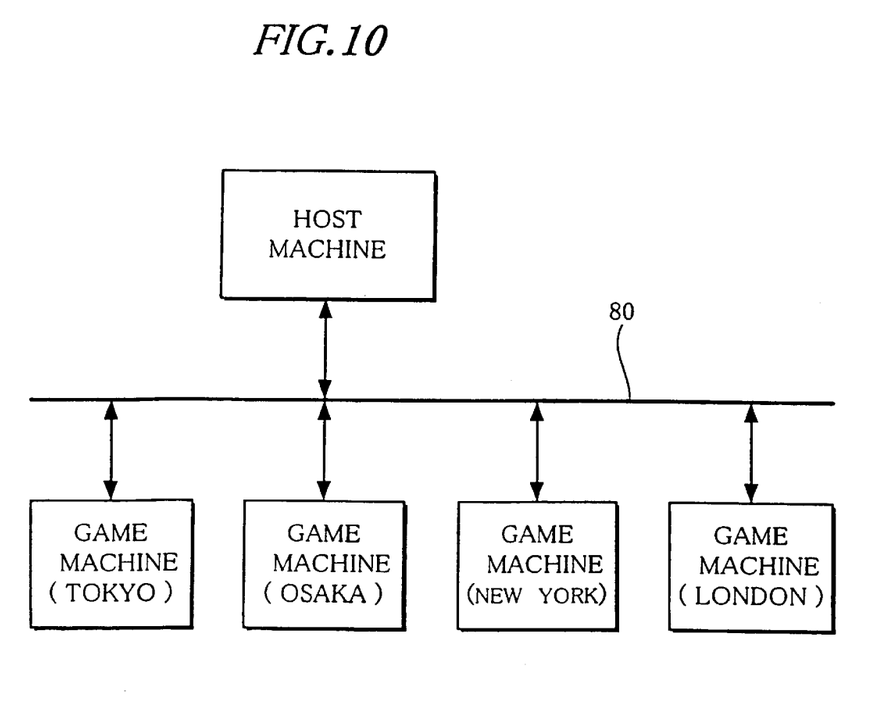
FIG. 10 is a view illustrating a remote communication.

As shown in FIG. 10, a host machine functioning as a communications node may be connected to game machines in the respective shops (in Tokyo, Osaka, New York and London) through a communications (or transmission) line 80 to perform a remote communication. Such a remote communication may be realized by utilizing ISDN with optical fiber cables as the communications line 80. If a plurality of game machines in each shop are to be connected to the communications line 80, such a server as shown in FIG. 9C may be provided.

Through such a remote communication, the number of players entering the game space can greatly be increased in comparison with the communications only between the game machines in each shop. The players can enjoy a multi-player type of game with a lot of other players in the world including Japan. Thus, the pleasure inherent in the multi-player type of game can highly be improved in addition to increase of the motivation in entering the game space.

With the remote communication, an all-time entry system in which many players can enter the game space at any time is more effective. In the remote communication, it is actually difficult that players at Tokyo and Osaka enter the game play at the same time. On the contrary, the all-time entry system enables the players at Tokyo and Osaka to enjoy the multi-play type game by entering the common game space at any time rather than the simultaneous entry to the game space.

In the remote communication, it is particularly effective to use face images (or player identification images) of the players taken by CCD camera (or any means for taking images) (see FIG. 7). Using such face images, for example, a player at Tokyo may visually recognize a celebrity at Osaka entering the game space in an easy manner. The entry of the celebrity can increase the motivation of the player at Tokyo entering the game play. Thus, the number of players entering the game space can further be increased.

The other players' information outputted in the present invention is not limited to those described in connection with FIGS. 5 and 6. For example, the outputted game results of the other players may include rank, score, hit rate, the number of defeated players, the number of infiltration missions into the enemy's position, the number of laps, victory or defeat, batting average, earned run average, he number of goals, occupied country and the number thereof, taken officer and the number thereof, the number of correct answers in quiz and rate of correct answer in quiz, clear time and so on.

Although this embodiment has been described as to parameter information relating to remodeling of the moving bodies or motorcars, the present invention is not limited to such parameter information relating to the moving bodies. In an example of fighting game, the parameter information may include information of power, offensive force, defensive force and so on obtained by training.

The game machine configuration of the present invention is not limited to that of FIG. 3, but may be embodied in any of various other forms.

Furthermore, the present invention may be applied to any of various other games (such as competition game, sports game, fighting game, roll playing game, and shooting game).

In addition, the present invention may be applied to any of various type of game machines such as domestic game machines, arcade game machines, simulators, large-scale attraction systems in which many player can enter a game, personal computers, multimedia terminals, and system boards for generating game images.

What is claimed is:

1. A game machine for a multi-player type of game in which a plurality of players play a game, said game machine comprising:

means for outputting information of other players with whom a player can play a game in a common game space;

means for a player to select at least one player from among other players for playing together, based on said other players' information; and means for performing game computation for enabling a player and said selected player to play a game in a common game space.

2. The game machine as defined in claim 1, wherein said other players' information includes at least one of information of other players' game scores, information of other players' histories, and information of moving bodies controlled by other players.

3. The game machine as defined in claim 2, wherein said information of other players' histories is retrieved and outputted based on identification information inputted by other players.

4. The game machine as defined in claim 1, wherein said other players' information includes parameter information of moving bodies controlled by other players.

5. The game machine as defined in claim 1, wherein said other players' information includes message information inputted by other players.

6. The game machine as defined in claim 1, wherein when a player has not selected another player for playing together, game computation is performed to implement a game play between the player and a computer in a common game space.

7. The game machine as defined in claim 1, further comprising, means for reserving at least one of: other players with whom a player can play a game; and a game space in which the player can play a game with other players.

8. The game machine as defined in claim 7, wherein when a player selects another player who is playing with a different player at that time, a new game play with the selected player is reserved.

9. An information storage medium for a game machine to be used for a multi-player type of game in which a plurality of players play a game, said information storage medium comprising:

information for outputting information of other players with whom a player can play a game in a common game space;

information for a player to select at least one player from among other players for playing together, based on said other players' information; and information for performing game computation for enabling a player and said selected player to play a game in a common game space.

10. The information storage medium as defined in claim 9, wherein said other players information includes at least one of information of other players' game scores, information of other players' histories, and information of moving bodies controlled by other players.

11. The information storage medium as defined in claim 10, wherein said information of other players' histories is retrieved and outputted based on identification information inputted by other players.

12. The information storage medium as defined in claim 9, wherein said other players' information includes parameter information of moving bodies controlled by other players.

13. The information storage medium as defined in claim 9,
wherein said other players' information includes message information inputted by other players.

14. The information storage medium as defined in claim 9,
wherein when a player has not selected another player for playing together, game computation is performed to implement a game play between the player and a computer in a common game space.

15. The information storage medium as defined in claim 9, further comprising,
information for a player to reserve at least one of: other players with whom a player can play a game; and a game space in which the player can play a game with other players.

16. The information storage medium as defined in claim 15,
wherein when a player selects another player who is playing with a different player at that time, a new game play with the selected player is reserved.

* * * * *

UNITED STATES PATENT AND TRADEMARK OFFICE
CERTIFICATE OF CORRECTION

PATENT NO. : 6,322,451 B1
DATED : November 27, 2001
INVENTOR(S) : Katsuhiro Miura It is certified that error appears in the above-identified patent and that said Letters Patent is hereby corrected as shown below:

<u>Title page,</u>
Item [54], replace Item [54] with the following:

-- [54] GAME MACHINE AND INFORMATION STORAGE MEDIUM --

Signed and Sealed this

First Day of October, 2002

Attest:

Attesting Officer

JAMES E. ROGAN
*Director of the United States Patent and Trademark Office*